United States Patent [19]

Chen

[11] Patent Number: 4,949,463
[45] Date of Patent: Aug. 21, 1990

[54] SAWING DEVICE ATTACHABLE TO REGULAR ELECTRIC DRILL

[76] Inventor: Yi-Chang Chen, No. 637, Sec. 1, Hsien Tung Rd., Changhua, Taiwan

[21] Appl. No.: 276,527

[22] Filed: Nov. 28, 1988

[51] Int. Cl.$^5$ .............................................. B26B 7/00
[52] U.S. Cl. ................................. 30/500; 144/136 K; 409/180
[58] Field of Search .................. 30/272 R, 272 H, 500, 30/122, 287, 293; 409/180, 182; 144/136 K

[56] References Cited

U.S. PATENT DOCUMENTS

| | | | |
|---|---|---|---|
| 3,274,889 | 9/1966 | Ferris | 30/272 K |
| 4,317,282 | 3/1982 | Pace | 30/122 |
| 4,821,357 | 4/1989 | Millette | 30/272 A |

FOREIGN PATENT DOCUMENTS 1384903  2/1975  United Kingdom .................. 30/500

Primary Examiner—Frank T. Yost
Assistant Examiner—Willmon Fridie, Jr.
Attorney, Agent, or Firm—Bacon & Thomas

[57] ABSTRACT

A sawing device attachable to regular electric drill, having a main body with a revolving shaft set thereinside to protrude therebeyond to drive an inner spiral gear set to rotate so as to further let an eccentric strut on a longitudinal gear push and pull a front link rod to make reciprocating motion to further carry the front prolonged saw blade to saw; said main body comprising a drill sleeve for fixation with regular electric drill tool to let the revolving shaft be fixedly connected with the revolving body of an electric drill so as to make use of the revolving power of the said electric drill to drive the sawing device to saw.

1 Claim, 3 Drawing Sheets

SAWING DEVICE ATTACHABLE TO REGULAR ELECTRIC DRILL

BACKGROUND OF THE INVENTION

1. Field of Invention

The present invention is to provide a sawing device and more particularly to a sawing device which is attachable to regular electric drill so as to make use of the revolving power of electric drill to drive the front prolonged saw blade to make reciprocating motion to saw articles.

2. Description of the Prior Art

Regular electric saw is normally to make use of a motor to drive a circular saw blade to rotate so as to perform sawing job, or to directly drive a ring-shaped saw to make a circular movement along a film-like locating plate to saw articles. Although conventional electric saws can provide good sawing effect, they normally are heavy and not convenient to operate. Further, regular electric saws are applicable for shearing purpose such as to cut trees or wooden materials. If to saw for a circular opening, one must have to use other tool to do the job. Therefore, regular electric saws are applicable only for specific occasions and not convenient for use in regular situations.

In view of said problems, the sawing device of the present invention is thus created to attach to regular electric drill for convenient operation to serve the people.

SUMMARY OF THE INVENTION

The main object of the present invention is to provide a sawing device attachable to regular electric drill to let the device be attached to regular electric drill tool so as to make use of the driving power of electric drill to drive the front prolonged saw blade to make reciprocating up and down motion to saw articles.

Another object of the present invention is to provide a sawing device attachable to regular electric drill to make use of the driving power of regular electric drill to drive the front prolonged saw blade to make reciprocating motion wherein the saw blade is a thin and narrow sawing tool applicable for circular sawing process, and the whole device is very light and convenient to carry and operate and is very practical to serve as a DIY tool.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
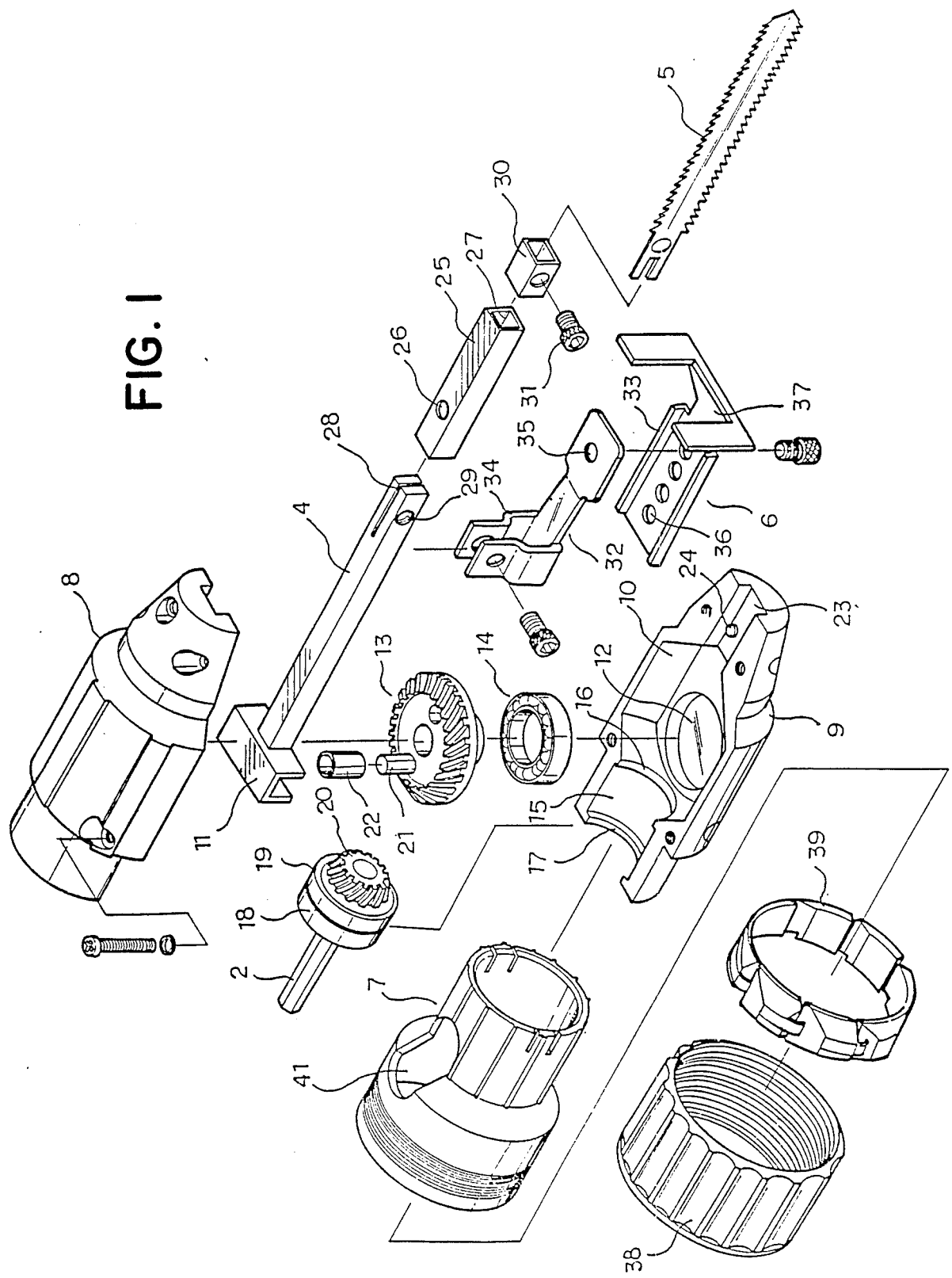
FIG. 1 is a perspective fragementary view drawing of the present invention.

Referring to FIG. 1, a sawing device attachable to regular electric drill according to the present invention is comprised of main body 1, revolving shaft 2, spiral gear set 3, link rod 4, prolonged saw blade 5, locating device 6 and drill sleeve 7, wherein the said main body 1 is comprised of an upper cover plate 8 and a lower cover plate 9 symmetrically arranged to form into a cylindrical configuration with both ends made in reducing size. The said cover plates 8 and 9 are arranged to provide an inner chamber 10 for the said spiral gear set 3 to set therein and for the back guide 11 of the said link rod 4 to move therein. The said chamber 10 is arranged to provide a round recess 12 at the center for a bearing 14 of a longitudinal spiral gear 13 to set therein so as to allow said longitudinal spiral gear 13 to smoothly rotate inside the chamber 10. Each of the said cover plates 8, 9 is respectively arranged to provide a semi-circular opening 15 at the reducing rear end with a respective flange 16, 17 made at the outer edge of block up two coupled bearings 18, 19 inside the opening 15. Therefore, when the said upper and lower cover plates 8 and 9 are fixedly attached together, the coupled two bearings 18, 19 are fixedly set in a cylindrical hole formed by means of two semi-circular openings 15.

The said revolving shaft 2 which is inserted from the bottom end of the main body 1 through the central hole of the two coupled bearings 18 and 19 is arranged to provide a transverse spiral gear 20 at the inner end to engage with the said longitudinal spiral gear 13 to form a spiral gear set 3 so as to convert the transverse rotation of the revolving shaft 2 into a longitudinal rotation. The said longitudinal spiral gear 13 is arranged to provide an eccentric strut 21 at the top with a sleeve 22 mounted thereon for the said back guide 11 of the link rod 4 to sit astride thereon.

The front reducing end of the upper cover plate 8 as well as the lower cover plate 9 is respectively arranged to provide a rectangular channel 23 having a strut 24 made thereon to let a double-height and rectangular hollow tube 25 to set therein such that the strut 24 is set in the corresponding hole 26 of the tube 25 to let the tube 25 and the main body 1 be fixedly connected together.

The said link rod 4 which is inserted through the central hole 27 of the rectangular tube 25 to protrude beyond the main body 1 comprises a bolt hole 29 to pierce through the gap 28 laterally for fixation of a prolonged saw blade 5 at the gap 28 by means of a bolt 31 after a sleeve 30 having been attached thereto, such that the rotation of the longitudinal spiral gear 13 drives the eccentric strut 21 to make a synchronous movement within the back guide 11 so as to further push and pull the link rod 4 to let the link rod 4 make a reciprocating motion within the rectangular hollow tube 25.

The said locating device 6 is comprised of a fixed bracket 32 is arranged to provide a clamping means 34 at one end for fixation of the bracket 32 with the rectangular hollow tube 25 at the outer end by means of screw joint, and a locating hole 35 at the other end for fixation of the bracket 32 with the movable support 33 by means of screw joint too. The said movable support 33 is an L-shaped frame, having one series of locating holes 36 made at one end to match with the locating hole 35 of the fixed bracket 32 for pitch-adjustable fixation by means of screw joint, and having a rectangular opening 37 made at the other end for arrangement of the said prolonged saw blade 5 therein to let the saw blade 5 be confined within the side walls of the rectangular opening 37.

Figure 4:
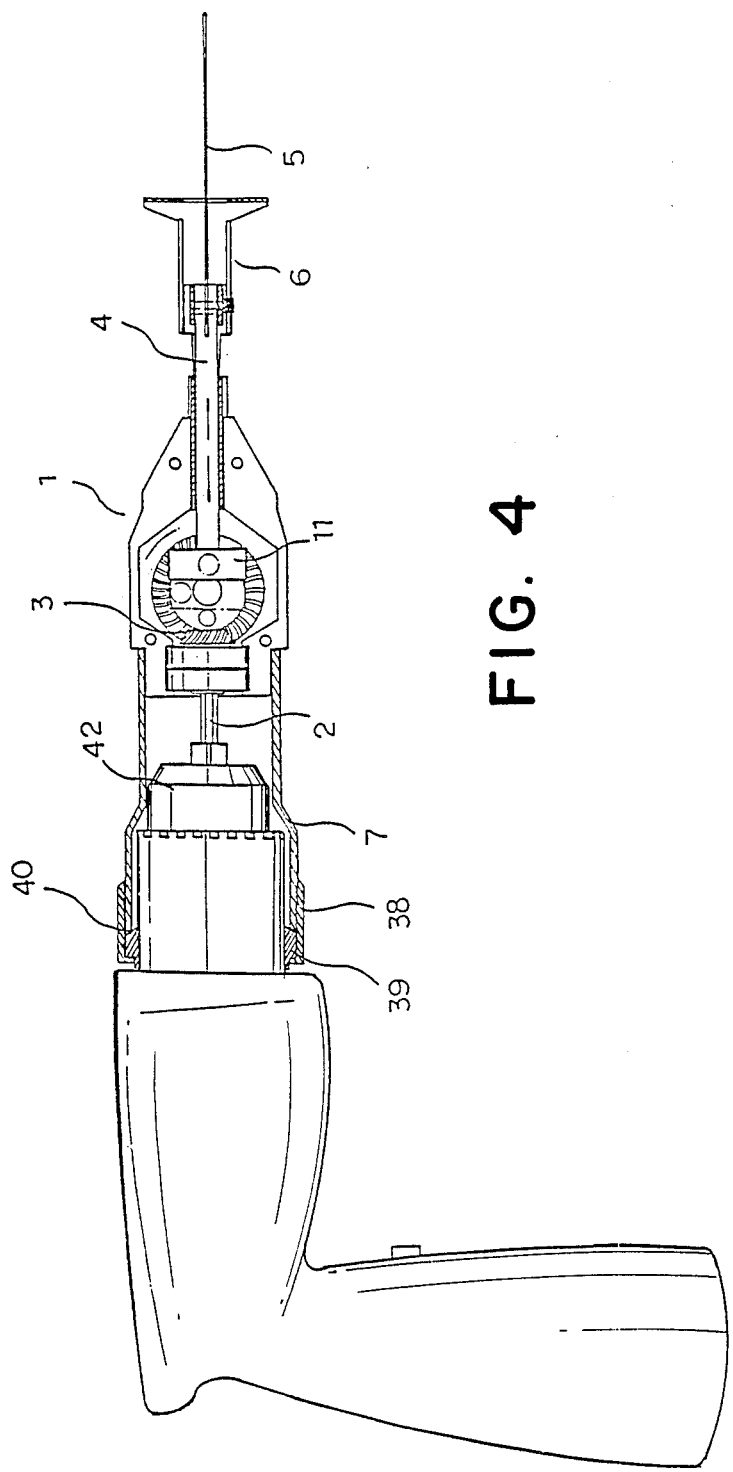
FIG. 4 is a schematic drawing illustrating the operation of the preferred embodiment.

The said drill sleeve 7 which is arranged at the back side of the main body 1 for an electric drill tool to attach thereto comprises a reduced and hollow front end to set in the rear reducing end of the main body 1. The rear end of the drill sleeve 7 is arranged to provide an outer thread for a hollow ring-shaped cover plate 38 to be mounted thereon by means of screw joint. The said hollow ring-shaped cover plate 38 is arranged to provide a lashing ring 39 thereinside to match with the obliquely edged rear end 40 of the drill sleeve 7, as shown in FIG. 4, to let electric drill tool be fixedly attached at the rear end of the drill sleeve 7 after the electric drill tool is set in the hollow cover plate 38 and the lashing ring 39, and after the hollow cover plate 38 is fixedly connected with the drill sleeve 7. Further, the drill sleeve 7 is arranged to provide a piercing hole 41 to let the revolving shaft 2 become accessible for a tool to fix the revolving shaft 2 to the revolving body 42 of the electric drill.

Figure 2:
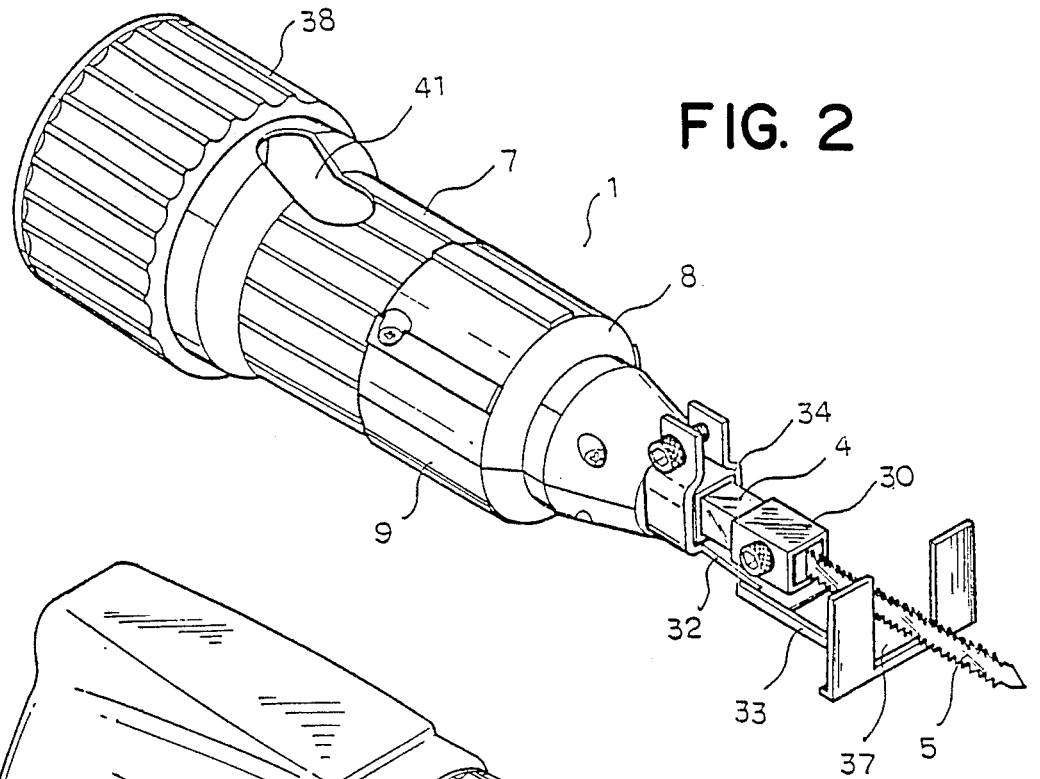
FIG. 2 is a perspective assembly view of the present invention.
Figure 3:
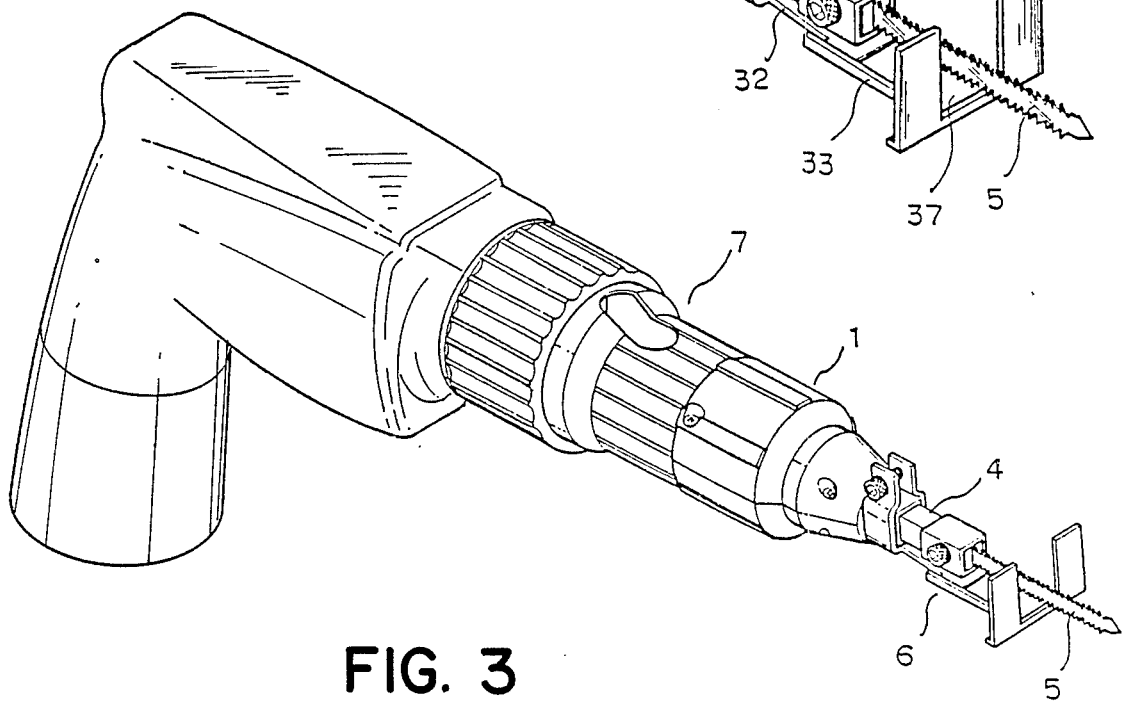
FIG. 3 is a perspective view of the present invention attached to an electric drill.

Referring to FIG. 2, FIG. 3 and FIG. 4, when to complete the whole assembly of an electric drill converted electric saw, it is to set a regular electric drill in the hollow cover plate 38 and the lashing ring 39, letting the hollow cover plate 38 be fixedly coupled with the drill sleeve 7 and letting the drill sleeve 7 be further set in the rear reducing end of the main body 1 so as to let the revolving shaft 2 inserted into the front revolving body 42 of the electric drill, and to use a hand tool, from the hole 41 into the drill sleeve 7, to fix up the revolving shaft 2 with the revolving body 42 so as to complete the assembly. When the motor of the electric drill is initiated, the revolving body 42 is driven to rotate to synchronously carry the revolving shaft 2 to revolve. At the time, the spiral gear set 3 inside the main body 1 is driven to rotate, and the eccentric strut 21 on the longitudinal spiral gear 13 is synchronously driven to move in the back guide 11 of the link rod 4 to further carry the link rod 4 to make a reciprocating movement within the rectangular hollow tube 25 so as to let the front prolonged saw blade 5 to saw.

In general, the present invention is to provide a device for directly attaching a regular electric drill tool to make use of the driving power of the electric drill to drive the front prolonged saw blade of the device to make a reciprocating motion to saw articles, which provides numerous features each of which tends to make the structure more simple, practical and utilitarian.

I claim:

1. A sawing device for attachment to an electric drill comprising:
    (a) a main body including symmetrically configured upper and lower cover plates having reduced front and rear end portions, the cover plates collectively defining an inner chamber having a round recess therein, a rear cylindrical-shaped hole and a front rectangular-shaped channel;
    (b) a spiral gear set disposed in the inner chamber and including a longitudinal spiral gear provided with a bearing disposed in the round recess, an eccentric strut and a sleeve disposed on the strut, and a transverse spiral gear provided with a coupled bearing assembly disposed within the rear cylindrical-shaped hole and a revolving shaft;
    (c) a hollow tube disposed in the front rectangular-shaped channel and means for securing the tube within the channel;
    (d) a link rod disposed through the hollow tube and extending outwardly of the main body, the link rod including means for securing a saw blade thereto at one end and guide means engageable with the strut and sleeve at another end;
    (e) a locating device secured to the hollow tube and including a fixed bracket and a movable support, the movable support being provided with a opening through which the saw blade extends and is confined within the periphery of the opening; and
    (f) a drill sleeve having a reduced hollow front end for attachment to the rear end of the main body, and a rear end provided with an outer thread, a hollow ring-shaped cover plate for threaded attachment to the outer thread of the drill sleeve, a lashing ring disposable within the cover plate and engageable with the drill sleeve for securing the drill sleeve to an electric drill, and a hole formed in the drill sleeve for permitting access to the revolving shaft for securing same to the electric drill.

* * * * *